TRAVELING WAVE MAGNETRON AMPLIFIER TUBES

Filed July 5, 1956 2 Sheets-Sheet 1

INVENTOR.
PHILIP T. SMITH
BY
William A. Zalesak
ATTORNEY

TRAVELING WAVE MAGNETRON AMPLIFIER TUBES

Filed July 5, 1956 2 Sheets-Sheet 2

INVENTOR.
PHILIP T. SMITH
BY
William A. Zalesak
ATTORNEY

United States Patent Office
3,076,115
Patented Jan. 29, 1963

3,076,115
TRAVELING WAVE MAGNETRON AMPLIFIER TUBES

Philip T. Smith, Princeton, N.J., assignor to Radio Corporation of America, a corporation of Delaware Filed July 5, 1956, Ser. No. 595,997
21 Claims. (Cl. 315—3.5)

This invention relates to improved traveling wave amplifier tubes which make use of magnetron principles. Particularly, it relates to amplifier tubes wherein a beam of spiralling electrons interacts with a helically oriented locus of points of constant phase of a given space harmonic of a signal wave to produce amplification of the signal wave.

Tubes of the invention exhibit the relatively high power and efficiency of conventional magnetron type tubes and the relatively wide bandwidth of the conventional traveling wave tubes of the type wherein an electron beam continuously interacts with a signal wave traveling along a delay line with substantially the same axial velocity as the beam. Such tubes of the invention prove especially advantageous for use as relatively high power amplifiers in applications requiring amplification of amplitude-modulated waves without any substantial phase modulation, such as in ultra high frequency color television transmitters, for example.

One object of the invention is to provide an improved electron tube capable of amplifying relatively high frequency signals over a relatively wide frequency band and wherein the power output is limited substantially only by mechanical considerations in the tube.

Another object is to provide an improved electron tube for the amplification of relatively high frequency currents and one capable of amplifying amplitude modulated waves without appreciable phase modulation of the waves.

Another object is to provide an improved traveling wave magnetron amplifier tube.

Stated generally, the foregoing and related objects are realized in accordance with the invention by the provision of a traveling wave magnetron tube comprising an elongated, angularly-periodic signal wave propagating structure adapted to propagate waves thereon along axial and transverse paths, and having a predetermined axial phase velocity, and means for projecting a beam of spiralling electrons along the wave propagating structure in wave interaction relation with a selected space harmonic of the two waves at an acute angle to the paths thereof, with the electrons having an axial velocity component substantially less than the predetermined axial phase velocity of the structure. The electrons in the beam are projected in angular paths along the structure such that at substantially all points in the path each electron is subjected to a substantially constant phase electric field produced by the selected space harmonic.

In one example of a traveling wave magnetron tube according to the invention, a hollow beam of spiralling electrons is injected axially into an elongated annular space between two concentric conductive structures in an axial magnetic field. One of the structures forms a wave transmission line that comprises an annular array of spaced, parallel conductors, capacitively coupled to each other. The electrons have a spiral path of such pitch that as each electron travels along its spiral path it is continuously subjected to an electric field of the same phase. The wave transmission line is excited by an input signal to establish an axially traveling wave and a circumferential standing wave. The axial and circumferential waves produce space harmonics or space harmonic waves in various helical directions around and along the conductors. The spiralling electrons in the beam interact with a constant phase of the electric field of a selected one of the space harmonics to produce amplification of the signal. This amplification is produced by the phenomenon wherein the electric field of the space harmonic bunches the spiralling electrons in groups and the electrons in the groups extract energy from a direct-current electric field between the transmission line conductors and the central conductor and give up energy to the transmission line.

In the drawing, wherein like numerals refer to like parts:

Figures 1, 2, 3, 4, 5, 6, 7:
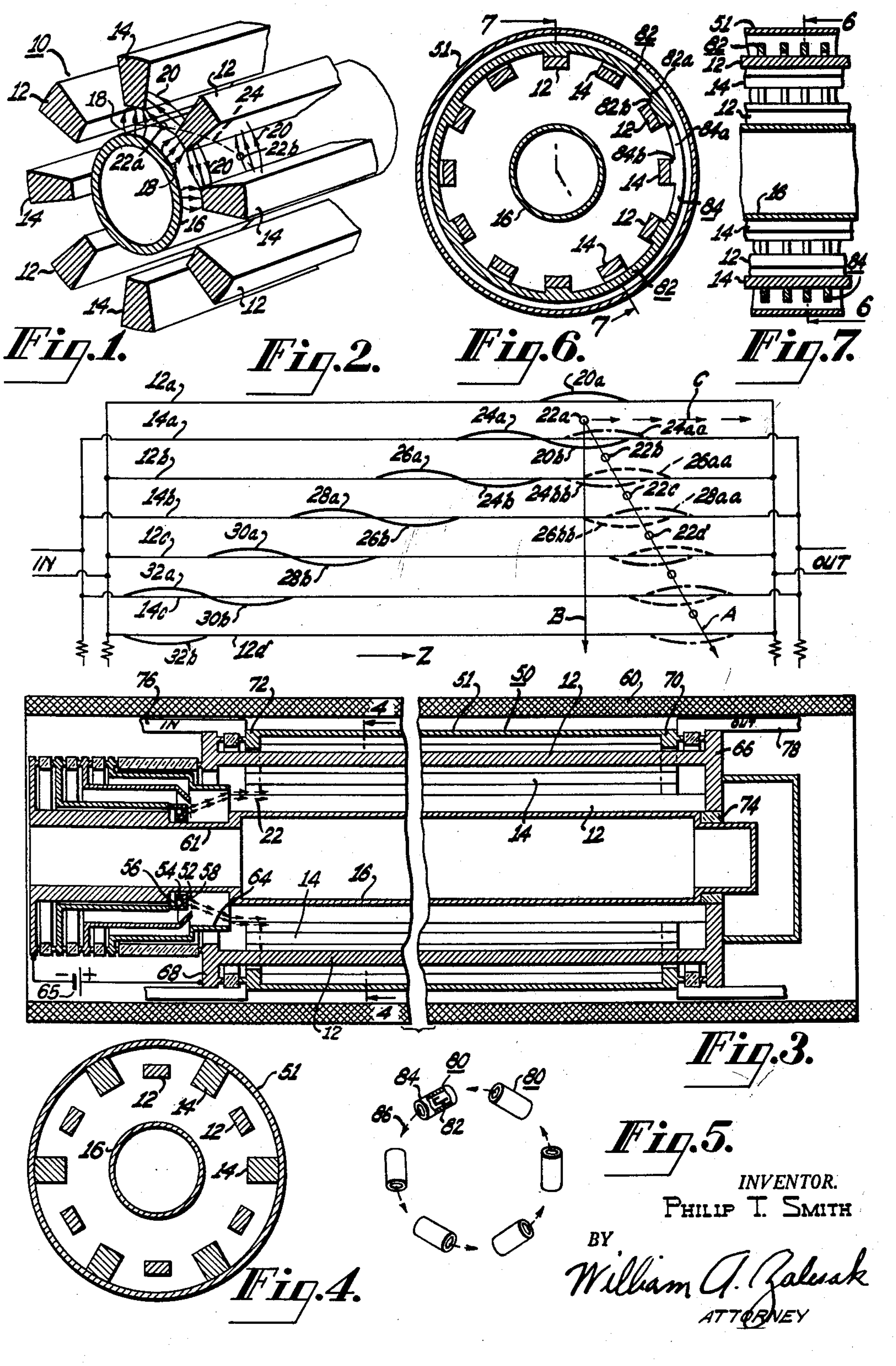
FIG. 1 is a schematic perspective representation of a portion of a tube according to the invention and illustrates interaction within the tube between a typical electron and the electric field of a traveling signal wave.
FIG. 2 is a diagram illustrating the operation of a traveling wave magnetron tube of the invention.
FIG. 3 is a longitudinal sectional view of a traveling wave magnetron tube according to the invention.
FIG. 4 is a tranverse sectional view taken along line 4—4 of FIG. 3.
FIG. 5 is a schematic representation of an inclined electron gun arrangement which may be used in place of the gun structure in the tube of FIG. 3.
FIG. 6 is a transverse sectional view of a traveling wave magnetron tube similar to the tube shown in FIG. 3 but embodying an aspect of the invention in which a wave transmission line is provided with an iterative structure for introducing axial delay along the line and for strapping alternate conductors of the line for $\pi$-mode type operation.
FIG. 7 is a fragmentary longitudinal sectional view taken along line 7—7 of FIG. 6.
Figure 8:
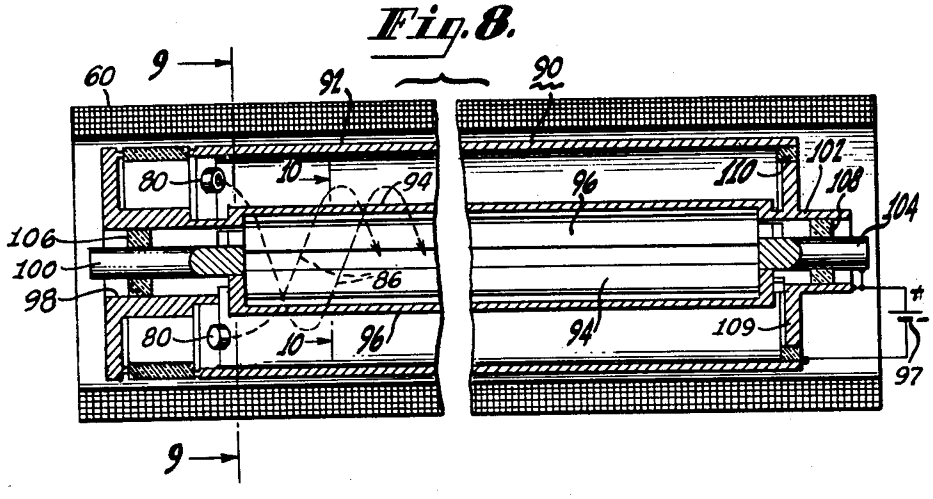
Figure 9:
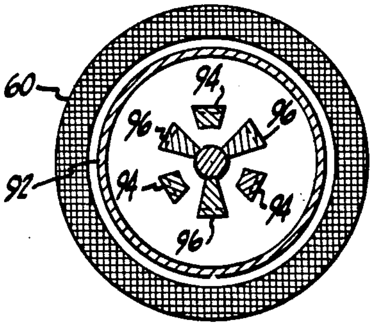
Figure 10:
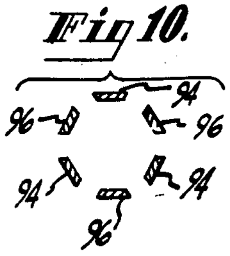

FIG. 8 is a longitudinal sectional view of a traveling wave magnetron tube of the invention similar to the tube shown in FIG. 3 but having the transmission line and center conductor interchanged in position, or inverted; and FIGS. 9 and 10 are transverse sections taken on the lines 9—9 and 10—10, respectively, of FIG. 8.

The general phenomena involved in the tube of the invention is represented in FIG. 1. A wave transmission line 10, comprised of an annular array of an even number of parallel elongated conductive elements 12 and 14, which elements constitute the anode of the tube, is arranged coaxially about an elongated inner conductor 16. A radial direct-current electric field 18, between the inner conductor 16 and each of the conductive elements 12 and 14, and a time-constant axial magnetic field (not shown) are used to achieve amplification of a signal wave. As will be more fully described in connection with FIG. 3, the elongated conductors 12 and 14 have their opposite ends connected to a signal input and a signal output, respectively, and the conductors are adapted to propagate signal waves axially and circumferentially therealong. For example, alternate conductors may be connected together, with each of the two sets of conductors connected at one end to one side of an input line and at the other end to one side of an output line. In such an arrangement the distribution of the circumferential radio frequency field 20 shown between the conductors 12 and 14 corresponds to the $\pi$-mode in a magnetron, that is, at a given instant, the radio frequency fields between adjacent pairs of conductors 12 and 14 have opposite polarity. Electrons 22 are propagated along the tube in the region between the inner conductor 16 and the outer conductors 12 and 14. The electron flow is comprised of a cylindrical shell of electrons having axial and circumferential components of motion so that the electrons have spiral paths as indicated by the dotted line 24, the dotted line representing a portion of the spiral path of one electron 22. The circumferential radio frequency field 20 traveling axially along the transmission line gives rise to an infinite number of sets of space harmonic waves in different directions, each set having different phase velocities in a given direction. Each set of space harmonic waves can interact with the beam, the most effective interaction taking place with the fastest wave of the set, the so-called fundamental space harmonic wave. The electrons are injected with circumferential and axial velocity components such that the pitch of the spiral path and the velocity of each electron is the same as the pitch and the velocity, respectively, of the selected space harmonic wave.

FIG. 2 illustrates the operation of the tube of the invention in comparison with a conventional magnetron, and also with a conventional traveling wave tube wherein electrons continuously interact with a signal wave traveling in the same direction.

In the diagram of FIG. 2, the wave propagating conductors 12 and 14 of FIG. 1 are illustrated as in a single plane for purposes of simplicity. As shown, alternate conductors are connected together so that signal waves traveling axially along alternate conductors (to the right in FIG. 2) are in phase. Adjacent conductors, being connected to opposite sides of the input line, are 180° out-of-phase with each other, $\pi$-mode type operation being assumed. At a given instant of time, during the operation of a tube of the invention, the wave form of portions of a sinusoidal signal would appear as illustrated by the pairs of half-waves, 20*a*, 20*b*, 24*a*, 24*b*, 26*a*, 26*b*, 28*a*, 28*b*, 30*a*, 30*b*, 32*a*, and 32*b* shown in solid curves. Waves at different axial distances along the conductors are chosen for convenience of explanation.

As has been indicated above, the spiralling electrons have a path of such pitch that as each electron goes from a given position between two conductors of the wave transmission line to a corresponding position between the next two conductors, it is subjected to an electric field component of the same phase as at the first position. Assume that at a given instant of time a given electron is at a position 22*a* midway between two conductors 12*a* and 14*a*, and is subjected to the maximum field produced by a given pair of half-waves 20*a* and 20*b*. At a succeding instant of time, when the same electron has moved along its spiral path to a position at 22*b* midway between the second conductor 14*a* and an adjacent third conductor 12*b*, the first pair of half-waves 20*a* and 20*b* have moved axially along the tube (in a directon to the right in FIG. 2) and the two half-waves 24*a* and 24*b* have moved axially of the tube to the position shown by the dot-dash lines 24*aa* and 24*bb*. In its new position 22*b* the electron is at the maximum field between half-waves 24*aa* and 24*bb* on adjacent conductors. Of course, the electron does not now "see" the same half-waves at the second position 22*b* as it "saw" at its first position 22*a*, but it "sees" instead the field of an analogous pair of half-waves. Similarly, when the electron arrives at position 22*c* it "sees" the field of another pair of half-waves 26*aa* and 26*bb* which look like the first pair 20*a* and 20*b*. This continues along the spiral path (arrow A) of the given electron. Thus, a given electron will "see" what appears to be the field of the same wave during its spiral travel. What the electron really "sees" is the field of the fundamental space harmonic wave propagated along the same spiral path as the electron. While given electrons will "see" the peak amplitude of the field of the space harmonic during their spiral travel, as described above, other electrons in other portions of the beam will see other amplitudes of the field of the same space harmonic, and hence, some electrons will be continuously accelerated while others are continuously decelerated, which will result in circumferential bunching of the electrons. The electron bunches thus formed interact with the fields of the space harmonic to increase the amplitude of the signal.

Using the same diagram (FIG. 2) the operation of a conventional magnetron, having a similar anode structure but having a short axial dimension, can be illustrated. The electron from the given initial position 22*a* would travel along a path perpendicular to the conductors indicated by the arrow B.

The same diagram (FIG. 2) also illustrates conventional traveling wave tube interaction. In such interaction, the electrons travel only in an axial direction C along a helix or other delay line, which corresponds to the conductors 12*a* and 14*a*, and stay in synchronism with the same signal wave, the wave having an axial velocity which is substantially the same as that of the electrons. In such a case, the delay line is provided with sufficient delay characteristic so that the wave is slowed down to the velocity of the electron.

The interaction between a signal wave and an electron can be noted by the following: Let us assume a signal wave propagated along the tube of the invention in an axial direction Z and a transverse standing wave. Then the condition for synchronism between a beam of spiralling electrons and a given or selected space harmonic of the two waves can be derived to be $$\omega_0=\frac{2\omega}{N(1+2m)}\cdot\left[1-\frac{v_0}{p_z}\right] \quad (1)$$

where $\omega_0$ is the angular velocity of the given space harmonic about the axis of the conductors, $v_0$ is the axial velocity component of the beam, N is the number of conductors, $\omega$ is $2\pi$ times the frequency of the signal wave, $p_z$ is the axial phase velocity of the signal wave (in the Z direction), and $m$ is the number of the space harmonic which is used, $m$ being equal to 0 for the fundamental space harmonic. In the case where $v_0=0$ (that is, no motion of the electrons in the Z direction), Equation 1 yields $$\frac{2\omega}{N(1+2m)}$$

which is the well-known formula for a conventional magnetron operating in the $\pi$-mode.

In the case where $v_0=p_z$, we have, from Equation 1 $\omega_0=0$. This is the condition for synchronism between an electron and a wave in a conventional traveling wave tube.

Equation 1 was derived assuming an incident wave in an axial direction, that is, a wave traveling in the same direction as that of the beam. If we use a reflected wave, that is, one traveling in the opposite direction from the beam, the condition for synchronism turns out to be $$\omega_0=\frac{2\omega}{N(1+2m)}\cdot\left[1+\frac{v_0}{p_z}\right] \quad (2)$$

With a transmission line having no appreciable delay, as shown schematically in FIG. 1 (and as will be shown in FIGS. 3 and 4), the phase velocity $p_z$ of the wave therealong is near the velocity of light. In this case the bracketed term in each of Equations 1 and 2 is so near unity that $\omega_0$ is nearly the same for incident and reflected waves. As will be explained in connection with FIGS. 6 and 7, the wave propagation conductors may be provided with axial delay so as to better separate the incident and reflected wave modes of operation.

Referring to FIGS. 3 and 4, there is illustrated a tube 50 according to one embodiment of the invention. Within an envelope member 51, which is of a magnetically transparent material, are the various internal tube elements. A relatively dense stream of electrons 22 is emitted from a thermionic electron emissive surface 52 of an annular cathode 54. The cathode is provided with a heater 56. Electrons 22 from the cathode 54 are accelerated through a grid 58 due to a positive bias on it. A solenoid coil 60 around the envelope member 51 produces a time-constant magnetic field parallel to the axis of the tube. After the electrons 22 pass through the grid 58 they are subjected to a radial direct-current electric field between a cylindrical center conductor 61 positioned around the axis of the tube and a longitudinally extending hollow electrode 64 spaced around and in coaxial relation with the center conductor 61. The hollow electrode 64 is biased at a higher positive potential than the center conductor 61 so as to establish the radial electric field which accelerates the electrons outwardly and across the axially-extending magnetic flux lines produced by the coil. The center conductor 61 and the other electrodes of the tube are made of a magnetically transparent material to maintain the axial magnetic field substantially free of distortion. As the electrons mave outwardly by virtue of the radial electric field aforedescribed and cross the magnetic flux lines they acquire spiral motion. The electrons then enter an annular interaction space between a cylindrical center conductor 16, which may be a continuation of the center conductor 61, and an annular array of longitudinally-extending, spaced, parallel conductors 12 and 14 which constitute the anode of the tube. In operation, a direct-current voltage source 65 is connected between the center conductor 16 and the outer conductors 12 and 14 to establish a radial direct-current electric field in the annular space therebetween. This radial electric field subjects the spiralling electrons to an outward force which together with the centrifugal force due to the spiral motion of the electrons, opposes the inward force exerted on the electrons by the axial magnetic field and maintains the electrons in the desired increasing spiral path as they give up energy to the signal wave. The electrons drift axially of the tube, with the spiral motion described, toward a collecting electrode 66 positioned at the end of the tube remote from the electron gun. Actually, most of the electrons will be intercepted by the anode conductors 12 and 14 as they move outwardly under the influence of the radial electric field.

The tube includes an even number of the anode conductors 12 and 14. As has been indicated before, alternate conductors are connected together to form two sets of conductors. The conductors 12 in one set are supported at their opposite ends by ring-spaced members; the collector electrode 66 forming one of the ring-shaped supporting members, and another ring-shaped member 68, at the end of the tube remote from the collector electrode 66, forms the other support member. The conductors 14 of the other set are supported at their opposite ends by inwardly extending annular portions 70 and 72 of a conductive envelope member 51, the portions 70 and 72 being positioned, respectively, adjacent to the ring shaped members 66 and 68. In order to aid in the assembly of the tube, the center conductor 62 may be supported by the collector electrode 66 at one end of the tube by means of a ceramic ring 74 sealed to the center conductor 62. The ring 74 may be slidable with respect to the collector electrode 66, to permit expansion and contraction of the parts.

Electromagnetic signal waves entering the transmission line 12 and 14 through a circumferential input line 76 coupled thereto will drive the transmission line with an electric field configuration in a plane normal to the tube axis similar to that for the $\pi$-mode of a magnetron. As has been explained before, the axial and circumferential electric fields of the waves give rise to an infinite number of sets of space harmonic waves, one of which is the space harmonic wave with which the spiralling electrons are in energy transfer relation. Each electron is subjected to a substantially constant phase electric field produced by the selected space harmonic, which results in bunching; and the energy abstracted from the electron bunches appears as an amplified signal wave in an output line 78 connected to the conductors 12 and 14.

As shown in FIG. 5, the electron gun in the tube of FIGS. 3 and 4 may be replaced by an annular array of electron guns 80 each inclined relative to the tube axis so that electrons from the cathode 82 of each electron gun 80 are accelerated by a grid 84 within the magnetic field and follow the desired spiral trajectories 86 which would be the same as those for the electrons in the tube of FIGS. 3 and 4. As shown in FIG. 5, the electron guns 80 each have an axis generally tangent to the desired spiral path of the electrons so that the electrons do not have to be given a radial component of motion in order to acquire the spiral motion required in the tube.

It will be understood that the couplings of the conductors 12 and 14 to the input and output lines should be designed to minimize reflections, to avoid oscillations due to amplification of reflected waves.

Consideration of such factors as possible backward wave oscillation may lead to the desirability of introducing axial signal wave delay along the wave propagation conductors 12 and 14. FIGS. 6 and 7 illustrate a tube similar to the tube of FIGS. 3 and 4 with the exception that it has a transmission line having delay in an axial direction. The delay is realized by a capacitive loading of the line by a series of ring-shaped members 82 and 84. The members 82 and 84, which are here illustrated as straps connecting alternate conductors 12 and 14 of the transmission line in $\pi$-mode operation, have a relatively small axial extent. Each of the members 82 and 84 is comprised of a ring-shaped portion **82*a* and 84*a* and a plurality of inwardly projecting portions 82*b* and 84*b***. It will be realized that when axial delay is introduced along the wave transmission line, the axial phase velocity of the signal wave, term $p_z$ in Equations 1 and 2, is reduced so that the value of $$\frac{v_0}{p_z}$$

is increased, $v_0$ remaining the same. With increased axial delay of the signal wave, that is, with decreasing values of $p_z$, the angular velocities ($\omega_0$) of the forward and backward modes of operation are separated so that the desired mode of operation may be more easily obtained. The capacitive loading of the transmission line in the axial direction renders the line periodic in the axial direction also, thus making it bi-periodic.

In the tube of the invention, some of the kinetic energy of the electron beam derived from the radial direct current field is given up by the electrons and is realized as an amplifiication of the signal wave, the axial kinetic energy of the electrons remaining constant. This is to be distinguished from the usual traveling wave tube where the energy used for amplification is the axial kinetic energy of the electrons. Consequently, since in the tube of the invention the axial kinetic energy is not used for amplification of the signal wave, there is no appreciable phase modulation of the signal wave with changes in amounts of energy abstracted from the electron beam, the changes in amounts of energy abstracted from the electron beam being the result of amplitude modulation of the signal wave. Thus, in the tube of the invention, the radial direct current electric field causes the electrons to move outwardly toward the transmission line conductors 12 and 14. As the electrons move outwardly they give up circumferential kinetic energy to the radio frequency electric field while retaining their original axial kinetic energy.

While the tube of the invention has been described with a hollow transmission line around a center conductor, and with the electron beam traveling between the outer transmission line and the center conductor, it will be appreciated that the transmission line may be disposed within the beam of spiralling electrons and the inner conductor, replaced by a hollow cylinder, may be disposed around the path of the electron beam and coaxial with the transmission line. The inverted structure is shown in FIGS. 8–10, wherein the tube 90 comprises a hollow cylindrical envelope member 92 of magnetically transparent material, which serves also as an outer conductor. A wave transmission line comprising an annular array of an even number of parallel elongated inner conductors 94 and 96, which inner conductors constitute the anode of the tube, is arranged coaxially within the outer conductor 92. An annular array of electron guns 80 each inclined relative to the tube axis is adapted to cooperate with an axial magnetic field produced by a solenoid coil 60 to produce a plurality of spiral beams 86 in the space between the inner conductors 94 and 96 and the outer conductor 92, in the same manner as in the embodiment of FIG. 5. The angular velocity component of the spiralling electrons with respect to the direction of the axial magnetic field is such that the force on the electrons resulting from the angular velocity component of the electrons in the axial magnetic field is directed radially outward. In operation, a direct-current voltage source 97 is connected between the outer conductor 92 and the inner conductors 94 and 96, as schematically shown, to establish a radial direct-current electric field in the annular space therebetween. This radial electric field subjects the electrons to an inward force which opposes the outward centrifugal and magnetic field forces and maintains the electrons in the desired spiral paths. Since the force on the electrons due to their angular motion in the magnetic field is outward, the spiralling electrons will move inwardly under the influence of the radial electric field, toward the conductors 94 and 96, as they give up energy to the wave traveling along the transmission line.

As shown in FIGS. 8–10, the conductors 94 and 96 may be coupled at the ends thereof to coaxial input and output lines, like the conductors 12 and 14 in FIG. 3. The input line comprises an outer tubular conductor 98 which is connected to one end of the alternate conductors 94, and an inner conductor 100 connected to one end of the other alternate conductors 96. The other ends of conductors 94 and 96 are similarly connected to outer and inner conductors 102 and 104, respectively, of the output line. The inner conductors 100 and 104 are coaxially supported within the outer conductors 98 and 102 by spacer insulators 106 and 108 which are sealed to the conductors to complete the vacuum envelope of the tube. The outer conductor 102 includes an outwardly extending collector 109 which is spaced from the outer conductor 92 by a ceramic ring 110 sealed therebetween.

It will be understood that the annular array of guns 80 of FIG. 8 may be replaced by an annular electron gun as described above in connection with FIG. 3, to produce a single hollow beam of spiralling electrons as distinguished from the plurality of separate spiral beams of FIG. 8.

From the foregoing it will be appreciated that the tube of the invention provides a means for amplifying relatively high frequency signals over a relatively wide frequency band and at a relatively high power level, and one wherein a relatively high efficiency is obtained in the amplification of amplitude-modulated high frequency signals without phase modulation of the signals. While the tube of the invention has been described in connection with the amplification of amplitude-modulated waves, it will be realized that the tube is also useful for the amplication of phase or frequency modulated signal waves. Furthermore, the tube may be used as a high power, high-efficiency oscillator if suitable means is provided for feeding energy back, in proper phase, from the output to the input of the tube.

What is claimed is:

1. A traveling wave tube comprising an elongated hollow cylindrical angularly-periodic signal wave propagating structure comprising means for propagating waves thereon along axial and circumferential paths with predetermined axial and circumferential phase velocities, to establish a large number of space harmonics having phase velocities along said structure in spiral paths at various acute angles to said paths; and means for projecting a beam of electrons within said structure in wave interaction relation therewith and along spiral electron paths at the same angle as a selected one of said space harmonics and with an electron velocity substantially equal to the phase velocity of said selected space harmonic, whereby at substantially all points in its path each electron of said beam is subjected to a substantially constant phase electric field produced by said selected spiral space harmonic.

2. A tube according to claim 1, wherein said structure includes axial delay means for determining an axial phase velocity substantially less than the speed of light.

3. A tube according to claim 1, wherein said structure is comprised of two sets of spaced parallel axially-extending conductors arranged in a closed array with each conductor extending along the entire length of said structure and with each conductor of one set alternating in position within said array with a conductor of the other set in the array and with alternate conductors connected together for $\pi$-mode operation.

4. A traveling wave tube according to claim 1, wherein said beam projecting means comprises an annular electron gun, two concentric conductors coaxial with the axis of said tube and means for establishing an axial magnetic field.

5. A traveling wave tube according to claim 1, wherein said beam projecting means comprises a circular array of electron guns adjacent to one end of said structure and oriented with their axes oblique to the axis of the tube, the circular array and a plane normal to the tube axis.

6. A traveling wave magnetron tube comprising an elongated angularly-periodic hollow cylindrical signal wave propagating structure comprising means for propagating waves thereon along axial and circumferential paths with predetermined axial and circumferential phase velocities, to establish a large number of space harmonics having phase velocities along said structure in spiral paths at various acute angles to said paths; an elongated conductor mounted coaxially within said structure, defining with said structure an annular space, and adapted to be biased negatively with respect to said structure to establish a radial direct current electric field in said space; and means for projecting a hollow substantially-cylindrical beam of electrons in said space and along said structure in wave interaction relation therewith and along spiral electron paths at the same angle as a selected one of said space harmonics and with an electron velocity substantially equal to the phase velocity of said selected space harmonic, whereby, at substantially all points in its path each electron of said beam is subjected to a substantially-constant phase electric field produced by said selected spiral space harmonic.

7. A traveling wave magnetron tube according to claim 8, wherein said wave propagating means comprises two sets of spaced parallel conductors arranged in a closed array with each conductor extending along the entire length of said structure and with each conductor of one set alternating in position with a conductor of another set and with alternate conductors connected together for $\pi$-mode operation.

8. A traveling wave tube comprising an elongated signal wave propagating structure comprising means for propagating signal waves thereon along longitudinal and transverse paths and having predetermined longitudinal and transverse phase velocities to establish a large number of space harmonics having phase velocities along said structure at various acute angles to said paths; and means for projecting a beam of electrons along said structure in wave interaction relation therewith and along electron paths at the same angle as a selected one of said space harmonics and with an electron velocity substantially equal to the phase velocity of said selected space harmonic, whereby at substantially all points in its path each electron of said beam is subjected to a substantially-constant phase electric field produced by said selected space harmonic.

9. A traveling wave magnetron tube according to claim 7, further comprising a series of ring-shaped straps distributed along the length of and connecting alternate conductors, whereby said predetermined axial phase velocity is substantially less than the speed of light.

10. A traveling wave tube comprising a wave transmission structure having distinct paths for waves to propagate therealong in mutually intersecting directions and establish space harmonics having phase velocities along said structure at various acute angles to said paths, means for directing electrons along said structure at substantially the same velocity as a selected one of said space harmonics, and output means coupled to said structure.

11. A traveling wave tube according to claim 8, wherein said wave propagating means comprises an even number of spaced parallel conductors inductively and capacitively coupled to each other and each extending along the entire length of said structure.

12. A traveling wave tube according to claim 8, further comprising an elongated conductor spaced from said structure to form an interaction space therebetween through which said beam is projected, and means for insulating said conductor from said structure.

13. A traveling wave tube according to claim 12, further comprising means for establishing a longitudinal magnetic field in said space, and means for biasing said conductor negatively with respect to said structure to establish a direct current electric field across said space.

14. A traveling wave magnetron amplifier tube including: an elongated bi-periodic wave propagating structure comprising means, including a hollow cylindrical array of spaced conductors, for propagating waves thereon along axial and circumferential paths with axial and circumferential phase velocities substantially less than the velocity of light, to establish a large number of space harmonics having phase velocities along said structure in spiral paths at various angles to said axial and circumferential paths; an elongated cylindrical conductor mounted coaxially within said structure, in insulated relation thereto, and forming therewith an annular interaction space; means for establishing an axial magnetic field in said space; means including said magnetic field for producing a hollow beam of electrons in said space and along said structure in wave interaction relation therewith and along spiral electron paths at the same angle as a selected one of said space harmonics and with electron velocities substantially equal to the phase velocity of said selected space harmonic; signal input means coupled to one end of said structure; and signal output means coupled to the other end of said structure.

15. A beam-type tube comprising a travelling wave circuit, said circuit comprising at least a pair of rectilinear conductors arranged to form a pair of longitudinal gaps therebetween, a conductor surrounding said circuit and spaced therefrom, means for applying an electric field between said circuit and said conductor, means for projecting an electron beam into said electric field adjacent to the circuit with an axial component of velocity, said beam following a helical path about said circuit and coupling with the electromagnetic wave carried by the same.

16. A beam-type tube comprising a travelling wave circuit serving to support electromagnetic waves, said circuit comprising at least two rectilinear conductors arranged to form longitudinal gaps between the same, said conductors serving to define a cylindrical surface, a cylindrical conductor surrounding said circuit and spaced therefrom, means forming a radial electric field between said circuit and said conductor, means for projecting an electron beam tangentially of said circuit with an axial component of velocity, said beam traversing a helical path between said circuit and conductor under the influence of the radial electric field and the centrifugal force of electrons.

17. A beam-type tube comprising a travelling wave circuit serving to support electromagnetic waves, said circuit comprising at least two rectilinear conductors arranged to form longitudinal gaps between the same, a cylindrical conductor surrounding said circuit and spaced therefrom, means forming a radial electric field between said circuit and said conductor, means for projecting an electron beam tangentially of said circuit with an axial component of velocity, said beam traversing a helical path between said circuit and conductor under the influence of the radial electric field and the centrifugal force of electrons.

18. A beam-type tube comprising a travelling wave circuit serving to support electromagnetic waves, said circuit comprising at least two rectilinear conductors arranged to form longitudinal gaps between the same, a cylindrical conductor surrounding said circuit and spaced therefrom, means for applying potentials to said circuit and said cylindrical conductor to establish a radial electric field therebetween, means for projecting electrons tangentially of said circuit with an axial component of velocity, said electrons traversing helical paths between said circuit and said cylindrical conductor under the influence of said radial electric field and the centrifugal force of said electrons.

19. A tube according to claim 18, further comprising means for establishing a longitudinal magnetic field in the space between said circuit and said cylindrical conductor.

20. A beam-type tube comprising a travelling wave circuit serving to support electromagnetic waves, said circuit comprising at least two rectilinear conductors arranged to form longitudinal gaps between the same, said conductors being so formed that their outer surfaces define a cylinder, a cylindrical conductor surrounding said circuit and spaced therefrom, means for applying an electric field between said circuit and said conductor whereby a radial electric field is set up between the same, a collector insulated from said conductor, an electron gun serving to project an electron beam into the electric field with an axial component of velocity, said beam following a helical path about said circuit and coupling with the electromagnetic waves carried by the same.

21. A beam-type tube comprising a travelling wave circuit serving to support electromagnetic waves, said circuit including at least two rectilinear conductors arranged to form longitudinal gaps between the same, said conductors serving to define a cylindrical surface, a cylindrical conductor surrounding said circuit and spaced therefrom, means forming a radial electric field between said circuit and said conductor, means disposed at one end of said circuit for projecting an electron beam tangentially of said circuit with an axial component of velocity, said beam traversing a helical path between said circuit and conductor under the influence of the radial electric field and centrifugal force of the electrons, a collector disposed at the other end of said circuit, said collector being insulated from said conductor.

References Cited in the file of this patent

UNITED STATES PATENTS

| | | |
|---|---|---|
| 2,424,965 | Brilloin | Aug. 5, 1947 |
| 2,542,797 | Cuccia | Feb. 20, 1951 |
| 2,623,129 | Lerbs | Dec. 23, 1952 |
| 2,694,159 | Pierce | Nov. 9, 1954 |
| 2,752,523 | Goodall | June 26, 1956 |
| 2,760,111 | Kumpfer | Aug. 21, 1956 |
| 2,774,005 | Kazan | Dec. 11, 1956 |
| 2,812,467 | Kompfner | Nov. 5, 1957 |
| 2,849,643 | Mourier | Aug. 26, 1958 |
| 2,858,472 | Karp | Oct. 28, 1958 |
| 2,888,598 | Palluel | May 26, 1959 |

FOREIGN PATENTS

| | | |
|---|---|---|
| 691,900 | Great Britain | May 20, 1953 |

UNITED STATES PATENT OFFICE

CERTIFICATE OF CORRECTION

Patent No. 3,076,115 January 29, 1963

Philip T. Smith

It is hereby certified that error appears in the above numbered patent requiring correction and that the said Letters Patent should read as corrected below.

Column 1, line 50, before the comma insert -- and in a radial direct-current electric field --; column 5, line 9, after "coil" insert -- 60 --; line 57, for "a circumferential" read -- an --; line 58, for "an" read -- a circumferential --; line 61, strike out "axial and circumferential"; line 62, after "the" insert -- axial and circumferential --; column 8, line 51, for the claim reference numeral "8" read -- 6 --.

Signed and sealed this 28th day of April 1964.

(SEAL)
Attest:

ERNEST W. SWIDER

Attesting Officer

EDWARD J. BRENNER

Commissioner of Patents